(12) United States Patent
Beutin et al.

(10) Patent No.: US 10,054,001 B2
(45) Date of Patent: Aug. 21, 2018

(54) V-SHAPED GEARBOX FOR DRIVING TURBOMACHINE EQUIPMENT

(71) Applicant: SNECMA, Paris (FR)

(72) Inventors: Bruno Albert Beutin, Evry (FR); Carmen Ancuta, Paris (FR); Lambert Olivier Marie Demoulin, Paris (FR)

(73) Assignee: SNECMA, Paris (FR)

( * ) Notice: Subject to any disclaimer, the term of this patent is extended or adjusted under 35 U.S.C. 154(b) by 301 days.

(21) Appl. No.: 14/775,292

(22) PCT Filed: Feb. 25, 2014

(86) PCT No.: PCT/FR2014/050391
§ 371 (c)(1),
(2) Date: Sep. 11, 2015

(87) PCT Pub. No.: WO2014/140441
PCT Pub. Date: Sep. 18, 2014

(65) Prior Publication Data
US 2016/0032755 A1 Feb. 4, 2016

(30) Foreign Application Priority Data

Mar. 14, 2013 (FR) ...................................... 13 52284

(51) Int. Cl.
*F01D 15/12* (2006.01)
*F01D 25/24* (2006.01)
(Continued)

(52) U.S. Cl.
CPC ............... *F01D 15/12* (2013.01); *F01D 5/02* (2013.01); *F01D 25/24* (2013.01); *F01D 25/28* (2013.01);
(Continued)

(58) Field of Classification Search
None
See application file for complete search history.

(56) References Cited

U.S. PATENT DOCUMENTS 4,571,936 A * 2/1986 Nash .................... F02C 7/20
244/54
6,212,974 B1 4/2001 Van Duyn
(Continued)

FOREIGN PATENT DOCUMENTS

EP  1 010 878 A2  6/2000
EP  2 372 129 A2  10/2011
(Continued)

OTHER PUBLICATIONS

International Search Report dated Jun. 25, 2014 for PCT/FR2014/050391 filed on Feb. 25, 2014.

*Primary Examiner* — Logan Kraft
*Assistant Examiner* — Jason Davis
(74) *Attorney, Agent, or Firm* — Oblon, McClelland, Maier & Neustadt, L.L.P.

(57) ABSTRACT

A gearbox for driving equipment of a turbomachine, including a substantially V-shaped box having two arms joined together by a joining part, the arms containing gear trains joined together at the joining part, and an attachment to the turbomachine. The attachment include a mechanism for insetting and/or for attaching the joining part and a suspension device of the arms.

7 Claims, 3 Drawing Sheets

(51) Int. Cl.
*F01D 25/28* (2006.01)
*F02C 7/32* (2006.01)
*F16H 57/025* (2012.01)
*F01D 5/02* (2006.01)
*F16H 57/03* (2012.01)

(52) U.S. Cl.
CPC ............ *F02C 7/32* (2013.01); *F16H 57/025* (2013.01); *F16H 57/03* (2013.01); *F05D 2220/30* (2013.01); *F05D 2220/36* (2013.01); *F05D 2250/38* (2013.01); *F05D 2260/40311* (2013.01)

(56) References Cited

U.S. PATENT DOCUMENTS

| | | | |
|---|---|---|---|
| 8,490,411 B2 * | 7/2013 | Suciu | F02C 7/32 60/788 |
| 8,973,465 B2 * | 3/2015 | Duong | F16H 1/222 60/802 |
| 2011/0239660 A1 | 10/2011 | Suciu et al. | |
| 2011/0289936 A1 | 12/2011 | Suciu et al. | |
| 2013/0042630 A1 | 2/2013 | Muldoon | |

FOREIGN PATENT DOCUMENTS

| | | |
|---|---|---|
| EP | 2 390 486 A2 | 11/2011 |
| EP | 2 559 883 A2 | 2/2013 |

\* cited by examiner

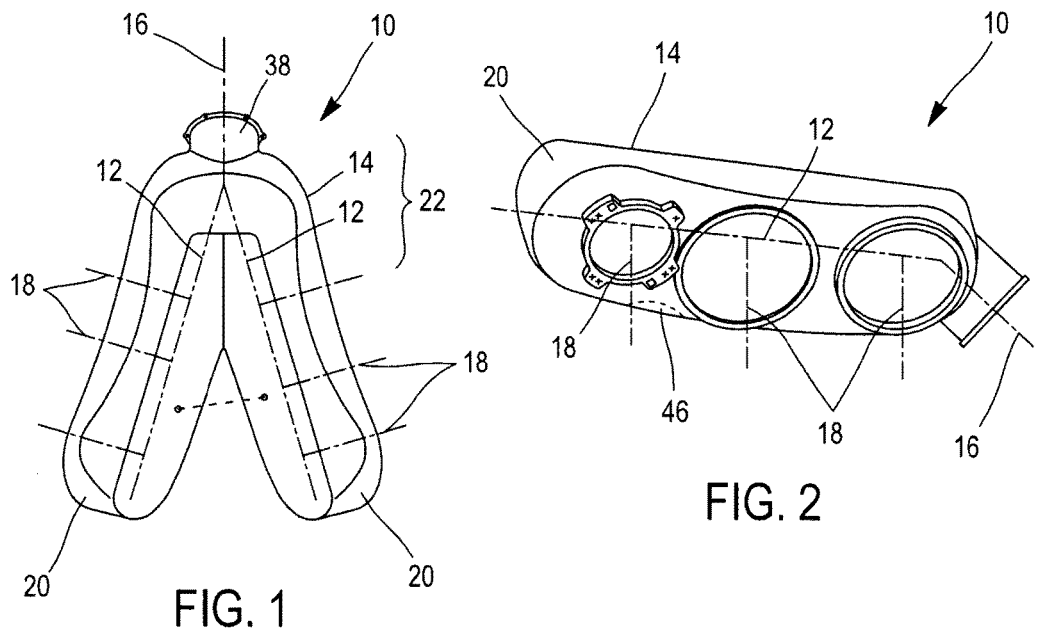
FIG. 1
FIG. 2
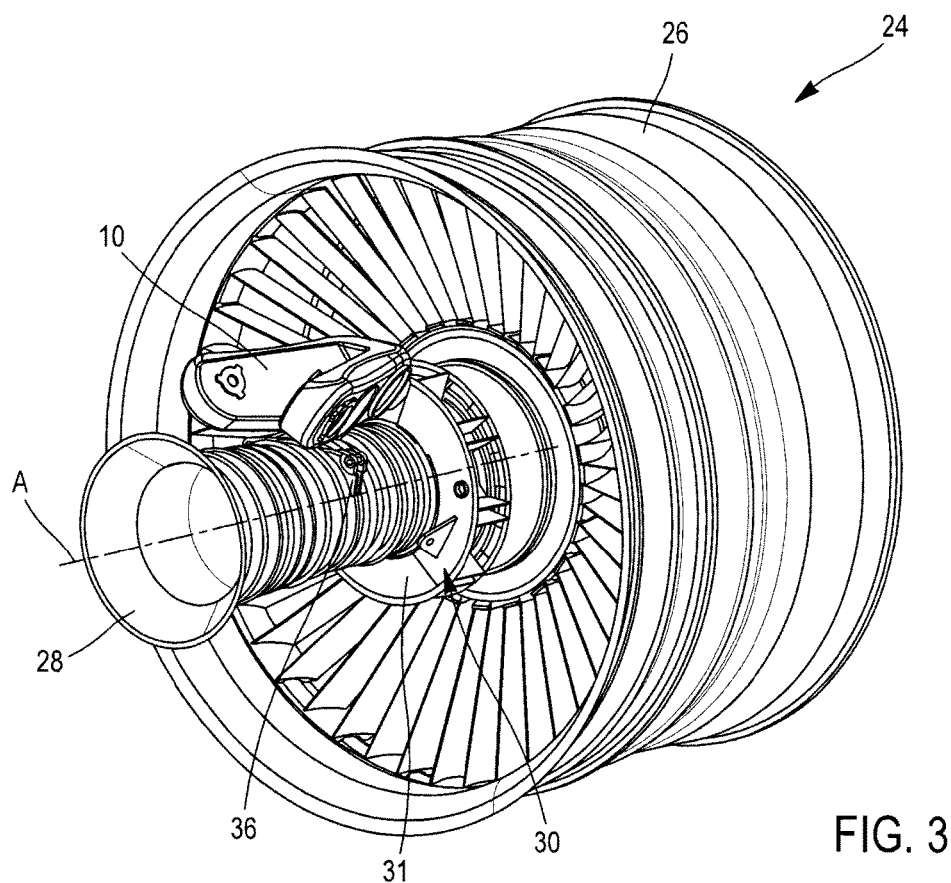
FIG. 3

US 10,054,001 B2

V-SHAPED GEARBOX FOR DRIVING TURBOMACHINE EQUIPMENT

TECHNICAL FIELD

The present invention relates to the attachment of a substantially V-shaped gearbox for driving turbine-engine equipment, such as a turbojet engine or a turboprop engine of an aeroplane.

The applicant has developed a gearbox of which the casing is substantially V-shaped and comprises two arms which are interconnected by a joining part. The arms enclose gear lines which are located in non-parallel planes and are joined to each other by at least one gear unit which is located in the part joining the arms. The gearbox further comprises means for attachment to a casing of the turbine engine.

Constructing the kinematic chain in a plurality of gear lines which are located in non-parallel planes makes it possible to arrange even a gearbox having large dimensions entirely in the proximity of the casing of the turbine engine, without too much space being taken up in the radial direction, the axial direction or in the angular direction, since the box is not rectilinear. In addition, there are a large number of surfaces of the gearbox (which extend in very different directions) to choose from for positioning the equipment, and this also contributes to limiting the size of the assembly.

It is important that the means for attaching the gearbox to the casing of the turbine engine are designed to minimise the deformations of said casing and to withstand the forces transmitted to the casing by the box during operation.

The object of the present invention is in particular to meet these requirements in a simple, efficient and economical manner.

DISCLOSURE OF THE INVENTION

The invention proposes a gearbox for driving turbine-engine equipment, comprising a substantially V-shaped casing and comprising two arms which are interconnected by a joining part which extends over part of the length of the arms, the arms being formed by two parts of said casing which are separate outside said joining part, the arms containing gear lines which are located in non-parallel planes and are interconnected in the region of the joining part, the gearbox further comprising means for attachment to the turbine engine, the attachment means comprising both means for embedding and/or attaching the joining part and means for the suspension of the arms.

The gearbox is thus embedded in and/or attached to the turbine engine and suspended therefrom at the same time, and this ensures said box is well attached and meets the above-mentioned requirements. The gearbox can be mounted on the turbine engine such that the joining part thereof is oriented towards the upstream end and such that the arms thereof extend towards the downstream end. The gearbox thus comprises upstream embedding and/or attachment means and downstream suspension means.

The casing of the gearbox preferably comprises a tubular member through which a shaft for driving the gear lines is intended to pass, said tubular member comprising an end which is connected to the part for joining the arms and an opposite free end part comprising the above-mentioned embedding and/or attachment means, the embedding and/or attachment means comprising, for example, an outer annular flange comprising screw-passage openings.

Advantageously, each arm of the casing is articulated to an end of a connecting rod which comprises, at the opposite end thereof, means for attachment to the turbine engine, said attachment means for example being means for articulation to a casing of the turbine engine. Each connecting rod may comprise means for adjusting the length thereof.

The arms of the casing are preferably interconnected by a transverse reinforcing member. This member rigidifies the casing of the box and thus limits the deformations thereof, in particular the fact that the arms move closer to and further away from each other.

The reinforcing member and the connecting rods may be located substantially in the same plane. This makes it possible to ensure that the forces are well distributed and well transmitted during operation.

One arm of the casing may be longer than the other arm. The transverse reinforcing member may be connected close to the downstream end of the shortest arm on one side and at a distance from the downstream end of the longest arm on the other side.

The present invention also relates to a turbine engine, such as a turbojet engine or a turboprop engine of an aeroplane, characterised in that it comprises a gearbox as described above.

Advantageously, the joining part of the gearbox is embedded in and/or attached to a hub of an intermediate casing of the turbine engine, and the arms of the gearbox are attached by connecting rods to the casing of a compressor, for example a high-pressure compressor, of the turbine engine.

The connecting rods are preferably oriented tangentially relative to the compressor casing. This allows the forces transmitted to the casing to be limited to tangential forces, and this limits the deformations of the casing.

The connecting rods may be articulated to a radially outer annular flange of the casing of the compressor. This flange locally rigidifies the casing. Connecting the connecting rods to this flange makes it possible to limit the risk of the casing deforming during operation.

DESCRIPTION OF THE FIGURES

The invention will be better understood and other details, features and advantages of the invention will emerge upon reading the following description given by way of non-limiting example and with reference to the accompanying drawings, in which:

FIG. 1 is a schematic perspective plan view of a V-shaped gearbox of a turbine engine;

FIG. 2 is a schematic perspective side view of the gearbox from FIG. 1;

FIG. 3 is a schematic perspective side view, viewed from downstream, of a turbine engine equipped with the gearbox from FIG. 1;

DETAILED DESCRIPTION

Figure 4:
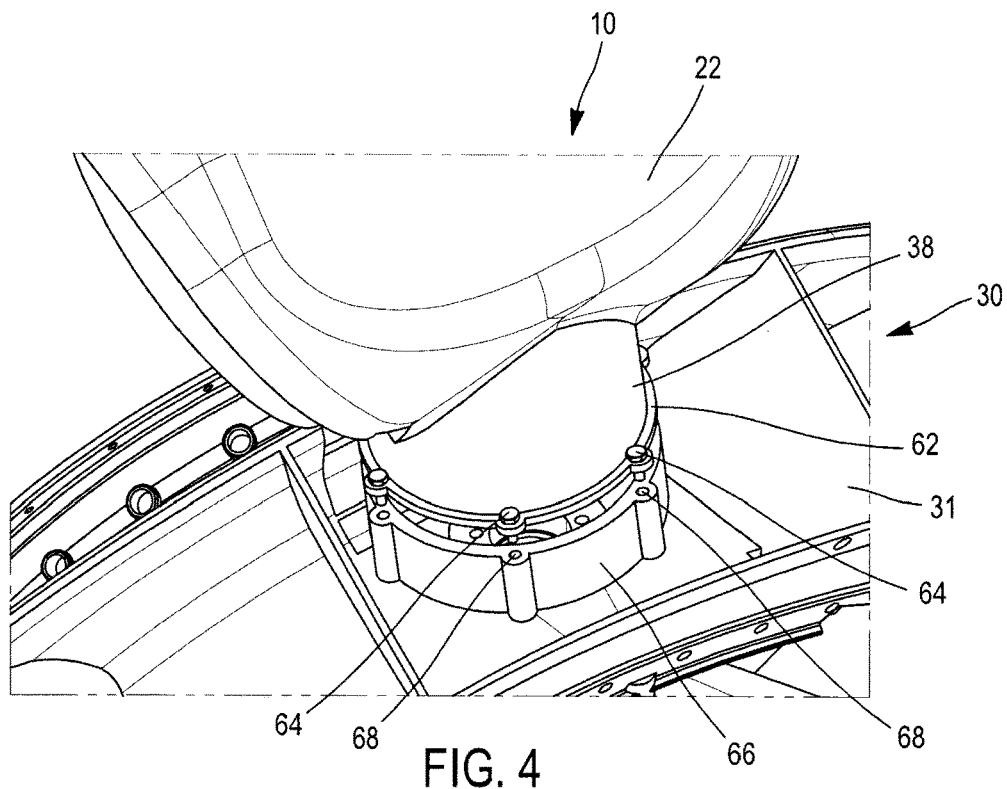
FIG. 4 is a schematic partial perspective view of the means for embedding and/or attaching the gearbox.

Reference is first made to FIGS. 1 and 2, which show a gearbox 10 for driving equipment (not shown) of a turbine engine, such as a turbojet engine or a turboprop engine of an aeroplane.

This gearbox 10 is intended to transmit mechanical power originating from the turbine engine by means of a radial shaft protruding therefrom, and to transmit said power to equipment such as pumps, electrical generators, etc. The transmission is carried out by a kinematic chain made up of successive gear units, said chain being made up of gear lines 12 which are located in non-parallel planes and are schematically shown by dashed lines in FIG. 1. A gear line 12 is a set of adjacent gear units which mesh with one another in principle and of which the toothed wheels are located in the same plane or in parallel planes; in other words, the rotational axes of the toothed wheels are all in parallel (perpendicular to this plane or to these parallel planes), and the toothed wheels which mesh directly with one another are considered to extend in the same plane; however, the gear line may extend in parallel planes if toothed wheels are present which are aligned along the same rotational axis or if offsets are present in the teeth in the same gear unit.

The gearbox 10 essentially comprises a kinematic chain which is made up of the set of toothed wheels, which mesh with one another so as to transmit a movement, within a casing 14. This chain is connected to a drive shaft 16 which is the radial shaft of the turbine engine or an intermediate shaft, the chain also being connected to take-off shafts 18 for the movement of the equipment. The gearbox 10 is attached to the turbine engine and the equipment itself is attached to the gearbox 10.

The casing 14 of the gearbox 10 is substantially V-shaped and comprises two arms 20 which are interconnected at one of the ends thereof by a joining part 22 which extends over part of the length of the arms. In the example shown, the arms 20 are the same length, and the joining part 22 extends over substantially half the length of the arms 20. The arms 20 are therefore formed by two parts of the casing 14 which are separate outside the joining part 22. Each arm 20 comprises at least one side face for mounting the equipment.

As can be seen in FIG. 3, the gearbox 10 is mounted on the body of the turbine engine 24, which in this case is a bypass turbojet engine. The invention may also apply to a turboprop engine. Conventionally, this turbine engine 24 comprises, from upstream to downstream, a fan 26 that generates a flow that divides into two coaxial flows, the primary flow supplying the engine, which comprises a low-pressure compressor, a high-pressure compressor, a combustion chamber, a high-pressure turbine, a low-pressure turbine and an exhaust nozzle 28 for ejecting the combustion gases. The turbine engine 24 further comprises, between the low-pressure compressor and high-pressure compressor, a structural intermediate casing 30 which typically comprises an intermediate hub 31 surrounded by two respectively inner and outer coaxial cylindrical walls (not shown), which define the passage duct for the secondary flow and are interconnected by radial tubular arms which are used in general for the passage of sub-systems.

In the example shown, the gearbox 10 is mounted downstream of the fan 26 in the space located between the casing 36 of the high-pressure compressor and the above-mentioned inner cylindrical wall (not shown) of the intermediate casing 30. The gearbox 10 is positioned such that the joining part 22 thereof is oriented towards the upstream end and such that the arms 20 thereof extend towards the downstream end and are located symmetrically on either side of a plane passing through the longitudinal axis A of the turbine engine. In the same way, for certain turbine-engine or turboprop-engine architectures, depending on the casings, the gearbox may be positioned such that the arms thereof extend towards the upstream end.

Figure 5:
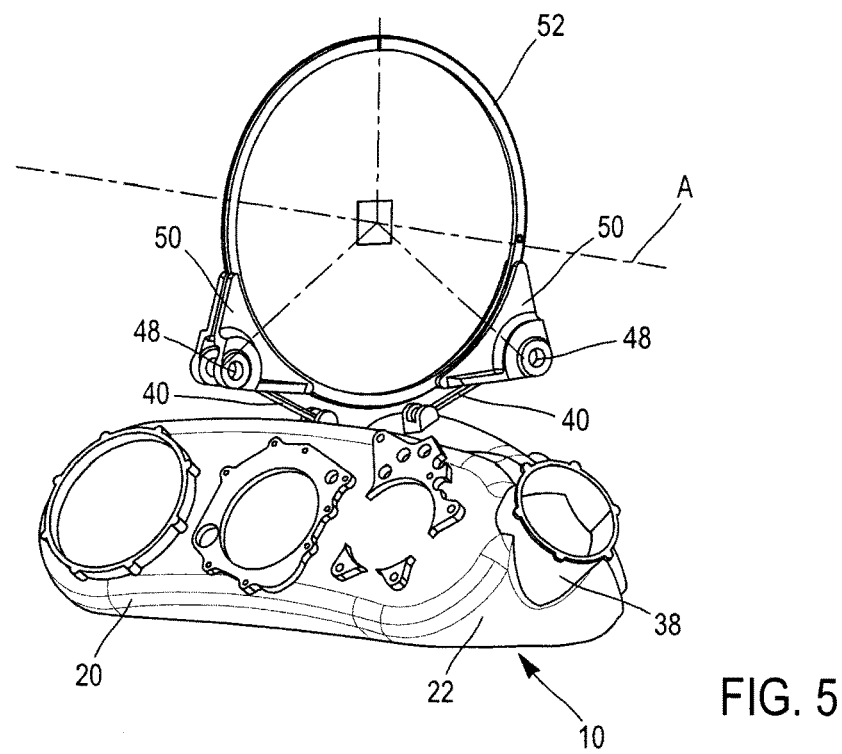
FIG. 5 is a schematic perspective view of the means for the suspension of the gearbox.
Figure 6:
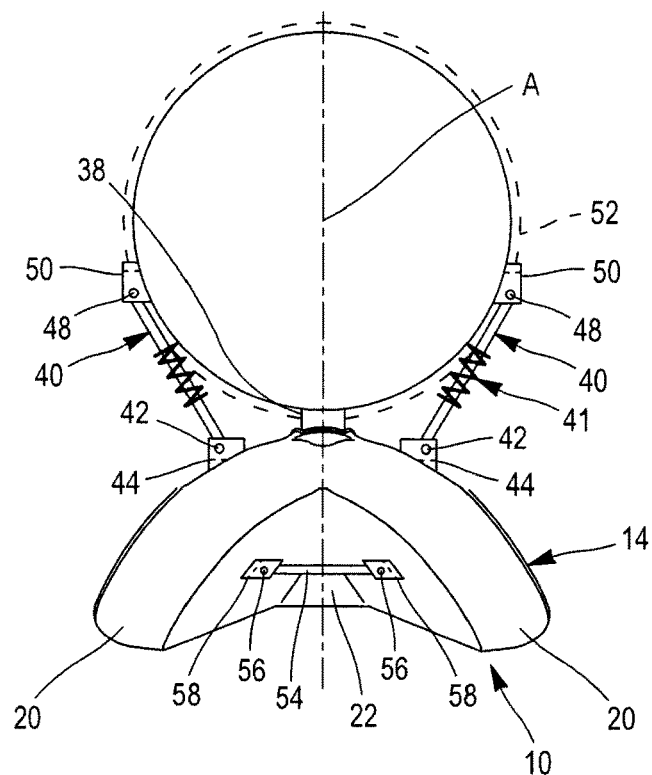
FIG. 6 is another schematic perspective view of the means for attaching the gearbox.

The gearbox 10 comprises, at the upstream end thereof, means 38 for attachment to and/or embedding in the hub 31 of the intermediate casing 30 (FIG. 4) and, at the downstream end thereof, means 40 for suspension from the casing 36 of the high-pressure compressor (FIGS. 5 and 6).

The casing 14 of the gearbox 10 comprises, at the upstream end thereof, that is to say on the side of the joining part 22, a tubular member 38 of which one end is connected to the casing 14 and of which the opposite free end part defines means for embedding in and/or attachment to the hub 31 of the intermediate casing 30. This free end part of the member 38 is intended to be inserted into a cup 66 having a shape which is complementary to the hub 31, and may comprise means for attachment to the cup 66 (FIG. 4). In this case, said attachment means comprise an outer annular flange 62 which is rigidly connected to the free end part of the member 38 and is intended to be placed on a radially outer end of a radial cylindrical cup 66 of the hub 31. The flange 62 comprises passage openings 64 for screws which are intended to be screwed into threaded openings in the periphery of the cup 66. The above-mentioned drive shaft 16 is intended to pass through the member 38.

In addition to the embedding and/or the attachment of the joining part 22 in/to the body of the turbine engine, the arms 20 of the casing 14 are attached to this body by suspension means 40, one embodiment of which is shown in FIGS. 5 and 6.

In this case, the suspension means comprise two connecting rods 40, each connecting rod 40 connecting one arm 20 to the body of the turbine engine and preferably to the casing 36 of the high-pressure compressor. Each connecting rod 40 has one end which is articulated to an arm 20 and one opposite end which is articulated to the casing 36 of the compressor. Each connecting rod 40 preferably comprises means 41 for adjusting the length thereof, it being possible for the connecting rod to comprise a threaded rod which is screwed to a greater or lesser extent into a threaded element in order to vary the length of the connecting rod and therefore the distance of the corresponding arm 20 from the body of the turbine engine.

In the example shown, each connecting rod 40 is articulated about a shaft 42 which is supported by a yoke 44 which is attached to the casing 14 of the gearbox, for example in the region 46 shown by the dashed lines in FIG. 2. The opposite end of each connecting rod 40 is articulated about another shaft 48 supported by a yoke 50 which is attached to the casing 36 of the compressor, it being possible for said yoke 50 to be rigidly connected to an outer annular flange 52 of the casing of the compressor 36; said flange 52 is used, for example, to attach coaxial cylindrical walls of this casing. The shafts 42, 48 for articulating the connecting rods are preferably parallel to each other and to the longitudinal axis A of the turbine engine.

The points for attaching the connecting rods 40 to the casing of the compressor 36 are preferably located such that the connecting rods are oriented tangentially relative to the casing 36. In the example shown in FIG. 6, the yokes 50 which are rigidly connected to the casing of the compressor are located at approximately 3:30 pm and 8:30 pm relative to the axis A, using the analogy of a clock face. This orientation of the gearbox and the attachments thereof will preferably be retained, but any angular position on the casings could be implemented (over 360° of the casings). The forces from the gearbox 10 are thus transmitted to the body of the turbine engine in a shearing manner, and this reduces the risk of the casing 36 of the compressor deforming. In a variant, the yokes 50 which are rigidly connected to the casing of the compressor may be located in other positions relative to the axis A, such that, for example, the gearbox 10 is located on one side of the casing.

In addition, to limit the risk of the casing 14 of the gearbox 10 being deformed and to improve the distribution of the stresses during operation, the arms 20 are interconnected by a transverse connecting rod 54 which extends between the arms, and of which the ends may be articulated to shafts 56 supported by yokes 58 which are rigidly connected to the arms (FIGS. 5 and 6). This connecting rod 54 may advantageously be located close to the downstream or free ends of the arms, in order to allow the inter-arm forces to be absorbed and to thus prevent fluttering between the arms, which would lead to premature wear of the casing 14 of the gearbox 10. The connecting rods 40 and 54 preferably extend in the same plane, which is for example perpendicular to the longitudinal axis A of the turbine engine. Therefore, continuity of the force path is ensured between the arms 20, the connecting rods 40 and 54 and the casing 36 of the high-pressure compressor to which the connecting rods 40 are articulated.

Figure 7:
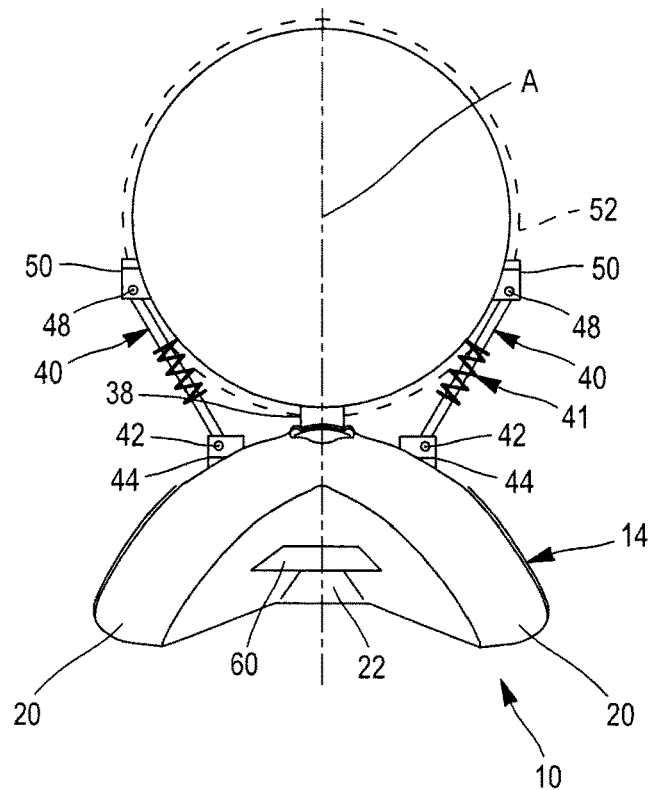
FIG. 7 is a view which corresponds to FIG. 6 and shows a variant of the invention.

The variant in FIG. 7 differs from the above-described embodiment in that the arms 20 are interconnected by a transverse rail 60, of which the ends are attached to the arms, for example by welding or brazing points, screw/nut-type means, rivets, etc. The transverse rail 60 and the connecting rods 40 also preferably extend in the same plane, for the above-mentioned reasons relating to the continuity of the force path.

Moreover, the arms 20 of the casing are not necessarily the same length. It may be advantageous to provide one arm to be longer than the other, so as to provide more possibilities for positioning the equipment. Such a configuration increases the risks of fluttering between the arms, and as a result it is particularly appropriate in this configuration to provide a transverse reinforcing member such as the connecting rod 54 or the transverse rail 60, which interconnect the arms, in order to prevent such fluttering. It also remains preferable for the transverse reinforcing member and the connecting rods 40 to extend in the same plane. In this case, the transverse reinforcing member may advantageously be connected close to the downstream end of the shortest arm on one side and at a distance from the downstream end of the longest arm on the other side.

The invention claimed is:

1. A turbine engine comprising:
    a gearbox comprising a substantially V-shaped casing including two arms which are interconnected by a joining part which extends over part of a length of the arms, the arms being formed by two parts of said V-shaped casing which are separate outside said joining part, the arms containing gear lines which are located in non-parallel planes and are interconnected in a region of the joining part;
    an upstream attachment system which attaches the joining part to an intermediate casing of the turbine engine; and
    a downstream attachment system which attaches the arms to a casing of a high pressure compressor of the turbine engine,
    wherein the gearbox is mounted downstream of a fan of the turbine engine in a space located between the casing of the high pressure compressor and an inner cylindrical wall of the intermediate casing, the arms extending downstream of the joining part along a longitudinal axis of the turbine engine and symmetrically on either side of a plane passing through the longitudinal axis of the turbine engine, and
    wherein the upstream attachment system includes a tubular member with a first end connected to the V-shaped casing of the gearbox and a second end which is inserted into a cup disposed on the intermediate casing, and an outer flange provided on the second end of the tubular member which is placed on a radially outer end of the cup.

2. The turbine engine according to claim 1, wherein the arms of the V-shaped casing are interconnected by a transverse reinforcing member.

3. The turbine engine according to claim 2, wherein the downstream attachment system includes a connecting rod for each arm, and wherein the transverse reinforcing member and the connecting rods are located substantially in a same plane.

4. The turbine engine according to claim 1, wherein the downstream attachment system includes a connecting rod for each arm, and wherein the connecting rods are oriented tangentially relative to the casing of the high pressure compressor.

5. The turbine engine according to claim 1, wherein the downstream attachment system includes a connecting rod for each arm, and wherein the connecting rods are articulated to a radially outer annular flange of the casing of the high pressure compressor.

6. The turbine engine according to claim 1, wherein the downstream attachment system includes two connecting rods, each connecting rod including a first end connected to one of the arms of the V-shaped casing of the gearbox and a second end connected to a yoke attached to the casing of the high pressure compressor.

7. The turbine engine according to claim 6, wherein each connecting rod comprises means for adjusting a length thereof.

* * * * *